Dec. 10, 1940.        H. H. CHESNY        2,224,780
MANUFACTURE OF CRYSTALLINE MAGNESIUM HYDROXIDE
Filed Sept. 15, 1937
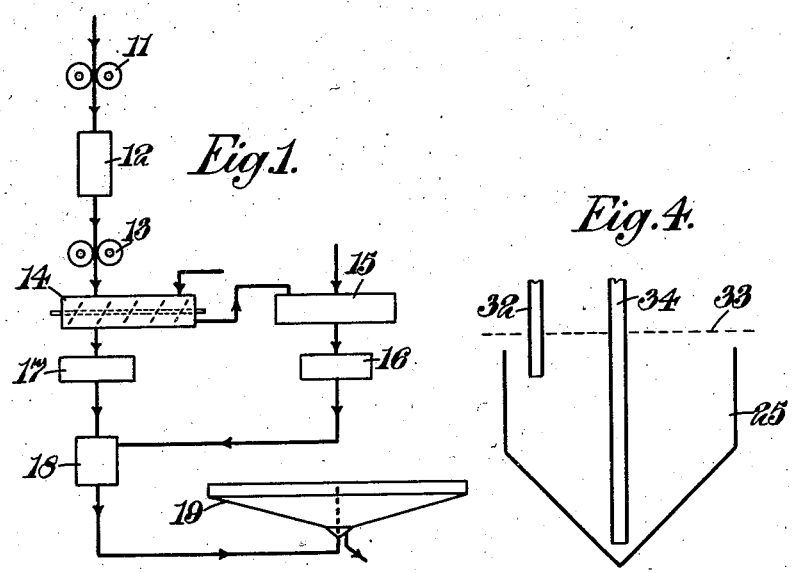
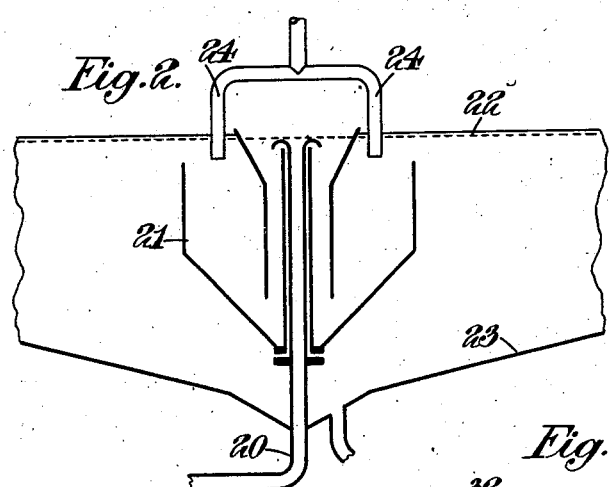
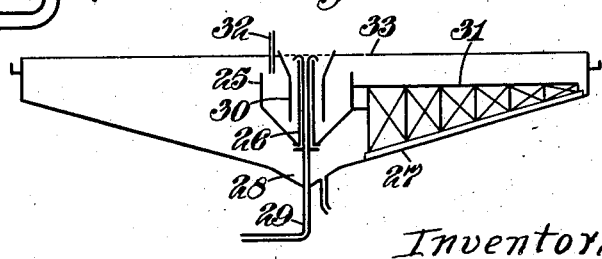
Inventor:
Heinz Henry Chesny,
By Stebbins, Blenko & Parmelee,
attys.

UNITED STATES PATENT OFFICE 2,224,780

MANUFACTURE OF CRYSTALLINE MAGNESIUM HYDROXIDE

Heinz Henry Chesny, Worksop, England

Application September 15, 1937, Serial No. 164,087
In Great Britain September 24, 1936

18 Claims. (Cl. 23—201)

This invention is for improvements in or relating to the manufacture of crystalline magnesium hydroxide.

Many attempts have been made to remove the calcium content of dolomite ($CaCO_3.MgCO_3$) to produce magnesite ($MgCO_3$) or so-called dead burned magnesite (MgO), which is used extensively for the production of high temperature refractories or for the purpose of manufacturing various magnesium compounds including the oxide, hydroxide and basic carbonate.

The processes hitherto proposed, among others, depend upon: (a) the difference in the decomposition temperature of calcium and magnesium carbonates; (b) the difference in the solubility of calcium and magnesium hydroxide; (c) the leaching of calcium hydroxide from the magnesium hydroxide by the solvent action of sugar or of similar compounds; (d) the complete dissolution of dolomite in acids, followed by the addition of an alkali; and finally (e) the calcination, slaking and treatment with carbonic acid under pressure, for the purpose of forming sparingly soluble calcium carbonate and soluble magnesium bicarbonate, followed by filtration and by boiling of the solution containing the magnesium bicarbonate to precipitate magnesium basic carbonate. The latter may be calcined to form magnesium oxide.

Owing to the incompleteness of the reactions, lack of purity of the resulting products, high process costs and poor yields, none of the above-mentioned processes has attained any commercial value, with the exception of that last mentioned. This last process has been applied extensively to the production of magnesia insulation and also to the manufacture of chemical compounds. However, the cost of production of magnesium oxide by this process is too high to permit of its utilisation in the production of refractories, since less than one half of the dolomite treated can be recovered in the form of magnesia. This is shown by the following equation, in which the final result only has been equated:

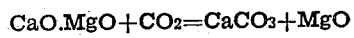
$$CaO.MgO + CO_2 = CaCO_3 + MgO$$

The calcium carbonate, which contains all impurities initially present, is generally discarded as a waste product.

I have found that the production of magnesium hydroxide may be economically and readily carried out by treating a solution containing a convertible magnesium salt with a slurry of calcined dolomite, dolomitic lime or the like and that when the reaction is carried out under controlled conditions the magnesium hydroxide is precipitated in the crystalline form.

The present invention accordingly includes a process for the manufacture of crystalline magnesium hydroxide from dolomite which comprises calcining the dolomite to convert substantially all the carbonate to oxide, forming a slurry of the calcined dolomite and mixing the slurry with an aqueous solution containing convertible magnesium salts with such a velocity of flow as to prevent or minimise the formation of hydrous magnesium hydroxide but sufficient to bring about effective mixing of the slurry and the aqueous solution.

The invention further includes a process in which the slurry is mixed with the aqueous solution containing convertible magnesium salts in a vessel to which the aqueous solution is admitted so as to impart to the body of liquid a rotary motion and the slurry is introduced in a downward direction below the surface of the aqueous solution so as to prevent or minimise the formation of hydrous magnesium hydroxide, the agitation during mixing and for a short time thereafter being sufficient to bring the reaction between the slaked dolomite and the convertible magnesium salts to substantial completion, and the liquid with its precipitate being thereafter passed to a separate vessel for the separation of the precipitated hydroxide therefrom.

The aqueous solution of convertible magnesium salts may consist of a solution of magnesium chloride and sulphate, or either one of the salts alone, such as is readily obtainable in the form of salt brines or preferably as sea water. The sea water is used as such, without previous concentration.

Precipitation of the magnesium hydroxide is preferably brought about in the presence of crystalline magnesium hydroxide previously formed.

Calcination of the dolomite is carried out at a temperature not less than 1200° C. and preferably at a temperature between 1350° C. and 1400° C. in order to ensure that the magnesium present in the dolomite shall be converted to relatively non-slaking or dead-burnt oxide while the calcium in said calcined dolomite is in the form of the oxide which slakes readily. Relative overburning of the dolomite may be accomplished also by burning at a lower temperature for a longer time. When in this dead-burnt condition the magnesia present in the slaked slurry will be in a coarse crystalline form and the rate of settling and filtration of the mixture of sea water and slurry is thus increased.

The calcined product is slaked in water to form the corresponding hydroxides, the slurry containing the hydroxides being preferably screened through a 70 mesh screen I. M. M. to remove such foreign matter, including unburned cores, silica and the like as may be present in larger particles, without the removal of coarse magnesium hydroxide or magnesium oxide.

The slaking of the oxides of calcium and magnesium resulting from the calcination of the dolomite should be carried out under such conditions as to form relatively large crystals of calcium hydroxide and this may be effected by keeping the concentration of solids in the slurry as high as possible while still maintaining the slaked mixture in the fluid form. It is therefore preferred to employ a slurry containing the calcium and magnesium hydroxides to contain more than 0.6 and preferably more than 1.6 pounds of dolomite, on the basis CaO.MgO, per imperial gallon. The formation of large crystals of calcium and magnesium hydroxides is facilitated by the use of relatively cold water for slaking the calcined dolomite and this in addition tends to minimise the conversion of magnesium oxide to magnesium hydroxide. The slaking may, alternatively, be brought about by the so-called dry slaking process employing superheated steam or by use of saturated steam.

If brine or sea water containing calcium bicarbonate is employed, there may be added to it a small quantity of dolomite slurry, for the purpose of precipitating the calcium as the sparingly soluble carbonate. The calcium carbonate together with any other foreign matter which may be present is removed by settling and by filtration through percolation sand filters.

The interaction of the dolomite slurry with the magnesium chloride and magnesium sulphate in sea water may be represented by the equation:

$$2Ca(OH)_2.Mg(OH)_2 + MgCl_2 + MgSO_4 = 4Mg(OH)_2 + CaCl_2 CaSO_4$$

Consequently, for each part of a theoretical dolomite (i. e. one containing one molecule of calcium carbonate and one molecule of magnesium carbonate) two parts of magnesia is obtained, or on a weight basis, 0.88 pound of magnesium hydroxide from one pound of theoretical dolomite (assuming 100% conversion).

The concentration of the brine or the sea water is such that the calcium sulphate remains in solution. Thus, the slurry of calcined dolomite is preferably added to sea water at the rate of 4.4 to 5.2 lbs. of dolomite oxide per 100 gallons of sea water. The calcium chloride being highly soluble even in concentrated solutions has no tendency to separate out. After completion of the reaction the magnesium hydroxide is allowed to settle and is subsequently washed to remove soluble salts such as chlorides and sulphates and concentrated further by filtration.

The presence of magnesium chloride and sulphate in contact with magnesium hydroxide promotes the formation of large crystals of the latter. Consequently, it is preferred to add to the sea water or brine only such amounts of the alkaline slurry as to leave up to ten per cent. of the sea water or brine unconverted.

A further expedient to insure the formation of large crystals of magnesium hydroxide lies in the addition of spent sea water or brine, that is the liquor from which the magnesium hydroxide has been precipitated in a previous operating cycle, to the dolomitic slurry.

It has been found that the method of adding the dolomite slurry to the sea water or brine is most important, in that the slurry should be introduced into the sea water or brine while the latter possesses a gentle rotary or swirling motion thus enabling the growth of single crystals to take place. At the same time, to insure a complete reaction of the calcium hydroxide with the magnesium salts it is necessary to provide sufficient velocity to the sea water or brine at the time of mixing with the dolomite slurry and for a short time afterwards to allow the reaction to become substantially complete. This result may be accomplished by causing the sea water or brine to flow together with the dolomite slurry so that the initial settling rate of the solids is barely overcome and by maintaining the solids and the sea water or brine in a zone of reaction previous to permitting the magnesium hydroxide formed to settle.

In order that large crystals of magnesium hydroxide may be formed by the interaction of a brine containing magnesium salts or sea water and a slurry of calcined dolomite, it has been found that a funnel-shaped reaction vessel may be employed with advantage, the sea water being introduced at the bottom of the funnel and the slurry of calcined dolomite being added just below the surface of the water. In this way the dolomitic slurry is retained in contact with the unconverted sea water until conversion of calcium hydroxide has taken place. The magnesium hydroxide rises to the top of the funnel and passes with the overflow into a settling tank. By this arrangement of apparatus (conical upcast) it is possible to effect an automatic retention of unconverted calcium hydroxide in the reaction zone and to carry out the reaction between the slurry of calcined dolomite and sea water in the presence of magnesium hydroxide previously formed. It is believed that the presence of magnesium hydroxide has the effect of bringing about crystal growth of the magnesium hydroxide subsequently formed.

If the magnesium hydroxide is to be converted to magnesium oxide, the final calcination of the magnesium hydroxide may be carried out by pumping the concentrated and filtered slurry containing from 25% to 50% of magnesium hydroxide directly into an internally fired rotary kiln. Alternatively, the slurry may be pre-dried using waste heat, e. g. from the rotary kiln. In order to dead-burn the magnesium oxide the temperature of calcination should be between 1550° and 1750° C. depending on the nature and amount of the impurities present and at the higher temperature dead-burning requires a time of about two hours.

When the final product is to be basic magnesium carbonate the slurry of magnesium hydroxide is diluted and treated with gases containing carbon dioxide, such as flue gas or lime-kiln gas, at a temperature not exceeding 70° C. in order to form $MgCO_3.3H_2O$ and this compound is then decomposed by heating to form mixed crystals containing from two to four molecules of magnesium hydroxide to each molecule of magnesium carbonate. The treatment with carbon dioxide or gas containing carbon dioxide must be carried out at a partial pressure of carbon dioxide just below that which is in equilibrium with magnesium bicarbonate which is soluble.

Following is a description by way of example and with reference to the accompanying diagrammatic drawing of methods and apparatus for carrying the invention into effect.

Figure 1 is a flow diagram of one embodiment of the complete process, and

Figures 2, 3 and 4 show three other arrangements of apparatus.

*Example*

Dolomite containing 56% $CaCO_3$ and 42% $MgCO_3$, the remainder consisting of impurities, is crushed in a crusher 11 as shown in Figure 1 and calcined in a stack or rotary kiln 12 at a temperature between 1350° C. and 1375° C. The oxide thus produced is crushed to half inch lumps in a crusher 13 and slaked with relatively cold water in the vessel 14. Bicarbonates are removed from sea water by the addition of 0.20 to 0.23 gram of dolomitic oxide per litre of sea water in the form of a dilute slurry, allowing to stand for about three to six hours in a tank 15 and then filtering through percolation filter beds 16. The slaking of the dolomitic oxide is carried out with softened fresh water or treated sea water, the temperature of the water being about 50° C. and the concentration of solid in the slaked slurry up to 3.7 lbs. CaO.MgO per gallon. The slurry is stirred for an hour and is then screened through a 70-mesh screen I. M. M. 17.

The slaking operation is carried out preferably in a paddle-type screw-conveyor in order to move the mixture of dolomitic oxide and water progressively through zones of increasing concentration (due to the removal of water both by hydration and by evaporation).

Sea water which has been treated and filtered as described above is preferably mixed with dolomitic hydroxide slurry at the rate of about 4.7 lbs. of dolomitic oxides per 100 gallons of sea water in a cylindrical reaction tank 18 which is entirely separate from the settling tank 19 and is connected thereto by means of a pipe running from the bottom of the reaction tank, through the bottom of the settling tank, and then upward, ending at a point in the centre of the settling tank approximately one foot below the surface of the liquid. Dolomitic hydroxide slurry is introduced into the separate reaction tank by means of a pipe vertically disposed, while the sea water is introduced tangentially at the side of the tank, near the top. Thus, a slow rotary motion of the sea water is brought about. The pipe introducing the dolomitic hydroxide may be moved from the centre towards the side of the reaction tank so as to suit varying volumes of flow, while affording suitable agitation. The pipe carrying the slurry which has reacted (and which consists of magnesium hydroxide suspended in sea water which has reacted) to the settling tank should be of such diameter that the velocity of the slurry does not exceed 100 ft. per minute, and preferably is about 30 ft. per minute. A conical hood, with its apex pointing upwards, shields the intake of the pipe from the entry of coarse material.

In an alternative arrangement of apparatus shown in Figure 2 the sea water, which has been treated for the removal of bicarbonates and filtered is fed upwards through a pipe 20 into the apex of a funnel-shaped reaction vessel 21 the rim of which lies a short distance below the surface indicated at 22 of the water in the main settling tank part of which is shown at 23 and the slaked and screened slurry is introduced through the pipes 24 into the funnel 21 just below the surface of the water at the rate of about 4.7 lbs. of dolomitic oxides per 100 gallons of sea water. The velocity of the sea water at the top of the mixing vessel (conical upcast) 21 may amount to one foot per minute and the velocity towards the apex of the funnel to about 300 ft. per minute. The lighter magnesium hydroxide rises to the top of the reaction vessel 21 and finally overflows the edge of the funnel into the settling tank 23 while the unconverted material sinks in the vessel 21 to a zone of more rapid flow.

Due to cohesion the slurry of dolomitic hydroxides falls through the sea water without mixing until it reaches a region of high velocity where the reaction takes place.

In the settling tank 23, the large-grained magnesium hydroxide (which consists essentially of single crystals having a diameter of from 5 to 25 microns) sinks very rapidly. The slurry obtained from the settling tank contains 125 to 175 grams of magnesium hydroxide per litre. The magnesium hydroxide is then filtered, washed while on the filter or previously to remove sodium chloride, calcium chloride and calcium sulphate and is subsequently employed for the preparation of dead-burnt magnesite which may be used in the production of high temperature refractories or for the manufacture of various magnesium compounds including the oxide, hydroxide or basic carbonate. Further it may be used for the manufacture of metallic magnesium.

An alternative form of apparatus for use in carrying out the reaction between dolomitic slurry and sea water is shown diagrammatically in Figure 3 and comprises a funnel-shaped reaction vessel 25 provided with an axial pipe 26 which closes the apex of the funnel and extends to a point slightly above the top edge of the vessel. The vessel is rotatably mounted within a settling tank 27 the floor of which slopes downwardly and inwardly towards a central outlet sump 28. A pipe 29 for the admission of sea water to the reaction vessel passes through the floor of the settling tank and through the axial pipe of the reaction vessel and overflows into the upper flared end of a conduit 30 which surrounds the axial pipe and which extends downwardly towards the apex of the vessel. This reaction vessel carries radial arms such as 31 which rotate with it and moving slowly over the floor of the settling tank serve to sweep the settled magnesium hydroxide down to the outlet sump 28.

Sea water entering the innermost pipe 29 of the reaction vessel 25 passes first upwardly, then after overflowing into the flared surrounding conduit 30 it passes downwardly to the bottom of the reaction vessel and from this point is again directed upwardly to meet descending dolomitic slurry introduced into the reaction vessel from one or more pipes 32 dipping slightly beneath the surface 33 of the water in the tank.

In yet another form of apparatus shown in Figure 4 the sea water may be fed to the reaction vessel 25 through one or more vertical pipes 34 which pass downwardly to the apex of the vessel.

In order to remove essentially all soluble impurities from the magnesium hydroxide it is preferred to heat the slurry leaving the settling tank to a temperature of the order of 90° C. and to maintain the slurry at an elevated temperature for say 8 hours. In this way adsorption effects are overcome and the removal of soluble impurities is facilitated greatly, while somewhat increased filtering rates are obtained at the same time.

In filtering the slurry of magnesium hydroxide it is essential to maintain a temperature of at least 50° C. and preferably 90° C. The filtration may conveniently be carried out by means of vacuum filters.

In the appended claims the term dolomite refers to minerals containing a substantial proportion of magnesium carbonate and shall not be construed to limit the invention to the use of pure dolomite:

I claim:

1. A process for the manufacture of crystalline magnesium hydroxide from dolomite which comprises calcining the dolomite to convert substantially all the carbonate to oxide, forming a slurry of the calcined dolomite, mixing the slurry with an aqueous solution containing convertible magnesium salts in a vessel to which the aqueous solution is admitted so as to impart to the body of liquid a gentle rotary or swirling motion and introducing the slurry below the surface of the aqueous solution so as to prevent or minimise the formation of hydrous magnesium hydroxide and thereafter passing the liquid with its precipitate to a separate vessel for the separation of the precipitated hydroxide therefrom.

2. A process for the manufacture of crystalline magnesium hydroxide from dolomite which comprises calcining the dolomite to convert substantially all the carbonate to oxide, forming a slurry of the calcined dolomite, mixing the slurry with a brine containing convertible magnesium salts, in a vessel to which the brine is admitted so as to impart to the body of liquid a gentle rotary or swirling motion and introducing the slurry below the surface of the brine so as to prevent or minimise the formation of hydrous magnesium hydroxide and thereafter passing the liquid with its precipitate to a separate vessel for the separation of the precipitated hydroxide therefrom.

3. A process for the manufacture of crystalline magnesium hydroxide from dolomite which comprises calcining the dolomite to convert substantially all the carbonate to oxide, forming a slurry of the calcined dolomite, mixing the slurry with a brine containing convertible magnesium salts, in a vessel to which the said brine is introduced tangentially so as to impart to the body of liquid a gentle rotary or swirling motion and introducing the slurry below the surface of the brine, and thereafter passing the liquid with its precipitate to a separate vessel at a velocity not exceeding 100 feet per minute and preferably at a velocity of about 30 feet per minute.

4. A process for the manufacture of crystalline magnesium hydroxide from dolomite which comprises calcining the dolomite to convert substantially all the carbonate to oxide, forming a slurry of the calcined dolomite, mixing the said slurry with a brine containing convertible magnesium salts while the latter has a gentle rotary or swirling motion, the slurry being introduced below the surface of the brine so as to prevent or minimise the formation of hydrous magnesium hydroxide and thereafter passing the liquid with its precipitate to a separate vessel for the separation of the precipitated hydroxide therefrom, coarse material being prevented from passing to said separate vessel.

5. A process for the manufacture of crystalline magnesium hydroxide from dolomite which comprises calcining the dolomite to convert substantially all the carbonate to oxide, forming a slurry of the calcined dolomite, mixing the said slurry with a brine containing convertible magnesium salts, the slurry being introduced below the surface of the brine so as to prevent or minimise the formation of hydrous magnesium hydroxide and continuing the mixing of the brine and the slurry until the reaction between the slaked dolomite and the convertible magnesium salts of the brine is brought to substantial completion.

6. A process for the manufacture of crystalline magnesium hydroxide from dolomite which comprises calcining the dolomite to convert substantially all the carbonate to oxide, forming a slurry of the calcined dolomite, mixing the said slurry with a brine containing convertible magnesium salts, the slurry being introduced below the surface of the brine so as to prevent or minimise the formation of hydrous magnesium hydroxide, formation of the crystalline magnesium hydroxide taking place in the presence of crystalline magnesium hydroxide previously formed and thereafter passing the liquid with its precipitate to a separate vessel for the separation of the precipitated hydroxide therefrom.

7. A process for the manufacture of crystalline magnesium hydroxide from dolomite which comprises calcining the dolomite at a temperature above 1200° C. and preferably at a temperature between 1350° C. and 1400° C. to convert substantially all the carbonate to oxide, forming a slurry of the calcined dolomite, mixing the said slurry with a brine containing convertible magnesium salts, the slurry being introduced below the surface of the brine so as to prevent or minimise the formation of hydrous magnesium hydroxide.

8. A process for the manufacture of crystalline magnesium hydroxide from dolomite which comprises calcining the dolomite at a temperature above 1200° C. and preferably at a temperature between 1350° C. and 1400° C. to convert substantially all the carbonate to oxide, forming a slurry of the calcined dolomite, mixing the said slurry with a brine containing convertible magnesium salts, the slurry being introduced below the surface of the brine so as to prevent or minimise the formation of hydrous magnesium hydroxide, and thereafter passing the liquid with its precipitate to a separate vessel for the separation of the precipitated hydroxide therefrom.

9. A process for the manufacture of crystalline magnesium hydroxide from dolomite which comprises calcining the dolomite to convert substantially all the carbonate to oxide, forming a slurry of the calcined dolomite by slaking the said calcined dolomite with relatively cold water, said slurry containing more than 0.6 and preferably more than 1.6 lbs. of dolomite (as CaO.MgO) per gallon, mixing the said slurry with a brine containing convertible magnesium salts, the slurry being introduced below the surface of the brine so as to prevent or minimise the formation of hydrous magnesium hydroxide.

10. A process for the manufacture of crystalline magnesium hydroxide from dolomite which comprises calcining the dolomite to convert substantially all the carbonate to oxide, forming a slurry of the calcined dolomite by slaking the said calcined dolomite with relatively cold water, said slurry containing more than 0.6 and preferably more than 1.6 lbs. of dolomite (as CaO.MgO) per gallon, mixing the said slurry with a brine containing convertible magnesium salts by introducing the slurry below the surface of the said brine so as to prevent or minimise the formation of hydrous magnesium hydroxide, and thereafter passing the liquid with its precipitate to a separate vessel for the separation of the precipitated hydroxide therefrom.

11. A process for the manufacture of crystalline magnesium hydroxide from dolomite which comprises calcining the dolomite to convert substantially all the carbonate to oxide, forming a slurry of the calcined dolomite, mixing the said slurry with a brine containing convertible magnesium salts previously treated for the precipitation and removal of calcium bicarbonate therefrom, the said slurry being introduced below the surface of the brine and thereafter separating the precipitated magnesium hydroxide.

12. A process for the manufacture of crystalline magnesium hydroxide from dolomite which comprises calcining the dolomite to convert substantially all the carbonate to oxide, forming a slurry of the calcined dolomite, mixing the said slurry with a brine containing convertible magnesium salts, the slurry being introduced below the surface of the brine so as to prevent or minimise the formation of hydrous magnesium hydroxide and thereafter separating the precipitated hydroxide therefrom, the amount of said slurry of calcined dolomite being such as to leave a proportion such as up to 10%, of the brine unacted upon.

13. A process for the manufacture of crystalline magnesium hydroxide from dolomite which comprises calcining the dolomite to convert substantially all the carbonate to oxide, forming a slurry of the calcined dolomite, mixing the said slurry with a brine containing convertible magnesium salts, the slurry being introduced below the surface of the brine so as to prevent or minimise the formation of hydrous magnesium hydroxide, separating the magnesium hydroxide from the liquid and removing soluble salts from said separated magnesium hydroxide by washing with soft water.

14. A process for the manufacture of crystalline magnesium hydroxide from dolomite which comprises calcining the dolomite to convert substantially all the carbonate to oxide, slaking the calcined dolomite by a dry slaking process forming a slurry of the slaked dolomite, mixing the said slurry with a brine containing convertible magnesium salts, the slurry being introduced below the surface of the brine so as to prevent or minimise the formation of hydrous magnesium hydroxide.

15. A process for the manufacture of crystalline magnesium hydroxide from dolomite which comprises calcining the dolomite to convert substantially all the carbonate to oxide, forming a slurry of the calcined dolomite, mixing the said slurry with a brine containing convertible magnesium salts, in the proportion of 4.4 to 5.2 lbs. of dolomitic oxide per one hundred gallons of sea water, the slurry being introduced below the surface of the brine so as to prevent or minimise the formation of hydrous magnesium hydroxide.

16. A process for the manufacture of crystalline magnesium hydroxide from dolomite which comprises calcining the dolomite to convert substantially all the carbonate to oxide, forming a slurry of the calcined dolomite, mixing the said slurry with a brine containing convertible magnesium salts, the slurry being introduced below the surface of the brine so as to prevent or minimise the formation of hydrous magnesium hydroxide, separating the precipitated hydroxide from the liquid as a slurry, diluting said slurry and treating it with a gas containing carbon dioxide at a temperature not exceeding 70° C. and subsequently heating the carbonated slurry for the formation of magnesium basic carbonate.

17. A process for the manufacture of crystalline magnesium hydroxide from dolomite which comprises calcining dolomite to convert substantially all the carbonate to oxide, forming a slurry of the calcined dolomite, mixing the said slurry with a dilute brine containing convertible magnesium salts, the slurry being introduced below the surface of the brine and kept separate from the main body of the brine until the reaction is substantially complete.

18. A process for the manufacture of crystalline magnesium hydroxide from dolomite which comprises calcining the dolomite to convert substantially all the carbonate to oxide, forming a slurry of the calcined dolomite, mixing the said slurry with brine containing convertible magnesium salts by introducing the slurry below the surface of the brine, removing the slurry of magnesium hydroxide from the spent brine, and maintaining the slurry at a temperature above 60° C. but below 100° C. for more than one hour but for less than ten hours.

HEINZ HENRY CHESNY.